(12) United States Patent
Begley et al.

(10) Patent No.: US 8,156,144 B2
(45) Date of Patent: Apr. 10, 2012

(54) METADATA SEARCH INTERFACE

(75) Inventors: John Begley, Seattle, WA (US); Sean Squires, Edmonds, WA (US); Max Kryatov, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 12/018,197

(22) Filed: Jan. 23, 2008

(65) Prior Publication Data
US 2009/0187542 A1 Jul. 23, 2009

(51) Int. Cl.
*G06F 17/30* (2006.01)
(52) U.S. Cl. ........ 707/774; 707/706; 707/707; 707/769; 707/779; 707/781; 707/802; 707/803
(58) Field of Classification Search .................. 707/706, 707/707, 769, 779, 781, E17.014, E17.061, 707/E17.067, E17.108, 999.003, 999.107, 707/774, 802, 803
See application file for complete search history.

(56) References Cited

U.S. PATENT DOCUMENTS

| | | | |
|---|---|---|---|
| 5,287,500 A * | 2/1994 | Stoppani, Jr. ................. | 711/211 |
| 6,347,398 B1 * | 2/2002 | Parthasarathy et al. ....... | 717/178 |
| 7,228,301 B2 | 6/2007 | Meyerzon et al. | |
| 7,565,360 B2 * | 7/2009 | Grizzard ............................ | 1/1 |
| 7,720,918 B1 * | 5/2010 | Martin et al. ................. | 709/206 |
| 2003/0233365 A1 * | 12/2003 | Schmit et al. ................. | 707/100 |
| 2004/0054672 A1 * | 3/2004 | Tsuchitani et al. ............... | 707/3 |
| 2004/0153968 A1 * | 8/2004 | Ching et al. ................... | 715/513 |
| 2004/0193596 A1 | 9/2004 | Defelice et al. | |
| 2004/0205473 A1 | 10/2004 | Fisher et al. | |
| 2005/0097462 A1 * | 5/2005 | Lumera et al. ................. | 715/522 |
| 2005/0108619 A1 | 5/2005 | Theall et al. | |
| 2005/0131941 A1 * | 6/2005 | Dettinger et al. .......... | 707/104.1 |
| 2005/0210008 A1 | 9/2005 | Tran et al. | |
| 2006/0129527 A1 * | 6/2006 | Li et al. ............................. | 707/3 |
| 2007/0143339 A1 | 6/2007 | Springett | |
| 2007/0192204 A1 * | 8/2007 | Pitkow ............................ | 705/26 |
| 2007/0192423 A1 | 8/2007 | Karlson | |
| 2007/0208719 A1 | 9/2007 | Tran | |
| 2007/0244866 A1 * | 10/2007 | Mishkanian et al. ............. | 707/3 |
| 2008/0306915 A1 * | 12/2008 | Wang et al. ........................ | 707/3 |
| 2009/0077056 A1 * | 3/2009 | Ravikumar et al. ............... | 707/5 |
| 2009/0119576 A1 * | 5/2009 | Pepper et al. ................. | 715/230 |

OTHER PUBLICATIONS

"Creating Shared Hosting Solutions on Windows SharePoint Services 3.0", http://office.microsoft.com/download/afile.aspx?AssetID=AM102157711033.
"Creating a Site Context Search Box that Uses SharePoint Portal Server Search Results", http://msdn2.microsoft.com/en-us/library/ms916808.aspx.
"User Interface Implementation", http://www.alexandria.ucsb.edu/public-documents/papers/japan-paper/node13.html.
Verhoeven, et al., "A Generic Metadata Query Tool", Forte, Wentland & Duval, 1997., pp. 1-6.

* cited by examiner

*Primary Examiner* — Khanh Pham
*Assistant Examiner* — Andalib Lodhi

(57) ABSTRACT

A system and method for implementing a metadata search interface is disclosed. The technology creates a configuration file for the metadata search interface comprising a predicate describing a search parameter of the metadata search interface. The configuration file further comprises a control attribute which associates the predicate with a control describing how a display element displayed on the metadata search interface is displayed and a correlation between the display element and the predicate. The technology further comprises generating the metadata search interface in runtime based upon the control.

15 Claims, 4 Drawing Sheets

METADATA SEARCH INTERFACE

BACKGROUND

As enterprises increasingly rely upon data networks to manage content, business processes, and share information, many enterprises want users to be able to find useful data and documents in a reliable manner. Thus, it is importance that there is a high relevance between the document or data properties that a user is seeking and the results of a content search. Additionally, it is important that a search does not return so much data such that the users cannot find the desired data or document.

One type of search that is performed by in enterprise systems is a keyword search in which a user enters relevant topics to initiate the search. Unfortunately, many keyword searches return such a volume of documents containing the keywords that the search results may not be useful. In other words, so much data is returned that the search initiator cannot find the desired data or document.

A metadata search is frequently more useful for finding data or documents where there is some prior knowledge of the content type. For example, an enterprise may have a customer relations database, a marketing research section, a library, a supply chain section, an accounts section, etc. Each of these departments comprises a known content type in which the properties of the data are known in advance. However, because each of these collections of data has different content types, a single metadata search solution may have limited utility. As a result, it is often desirable to create a different metadata search interface for each content type in an enterprise. However, it is often time consuming to develop a customized search solution in addition to creating the user interface (UI) for each content type.

SUMMARY

This Summary is provided to introduce a selection of concepts in form that are further described below in the Detailed Description. This Summary is not to be used as an aid in determining the scope of the claimed subject matter.

A system and method for implementing a metadata search interface is disclosed. The technology creates a configuration file for the metadata search interface comprising a predicate describing a search parameter of the metadata search interface. The configuration file further comprises a control attribute which associates the predicate with a control describing how a display element displayed on the metadata search interface is displayed and a correlation between the display element and the predicate. The technology further comprises generating the metadata search interface in runtime based upon the control.

DESCRIPTION OF THE DRAWINGS

The accompanying drawings, which are incorporated in and form a part of this specification, illustrate embodiments of the technology for a metadata search interface and, together with the description, serve to explain principles discussed below.

DETAILED DESCRIPTION

Reference will now be made in detail to embodiments of the present technology for a metadata search interface, examples of which are illustrated in the accompanying drawings. While the technology for a metadata search interface will be described in conjunction with various embodiments, it will be understood that they are not intended to limit the present technology for a metadata search interface to these embodiments. On the contrary, the presented technology for a metadata search interface is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for a metadata search interface. However, the present technology for a metadata search interface may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "determining", "generating", "correlating", "selecting", "sending", "using", "conveying" or the like, refer to the actions and processes of a computer system, or similar electronic computing device. The computer system, or similar electronic computing device, manipulates and transforms data represented as physical (electronic) quantities within the computer system's registers and memories into other data similarly represented as physical quantities within the computer system memories or registers or other such information storage, transmission, or display devices. The present technology for a metadata search interface is also well suited to the use of other computer systems such as, for example, optical and mechanical computers.

Example Computer System Environment

Figure 1:
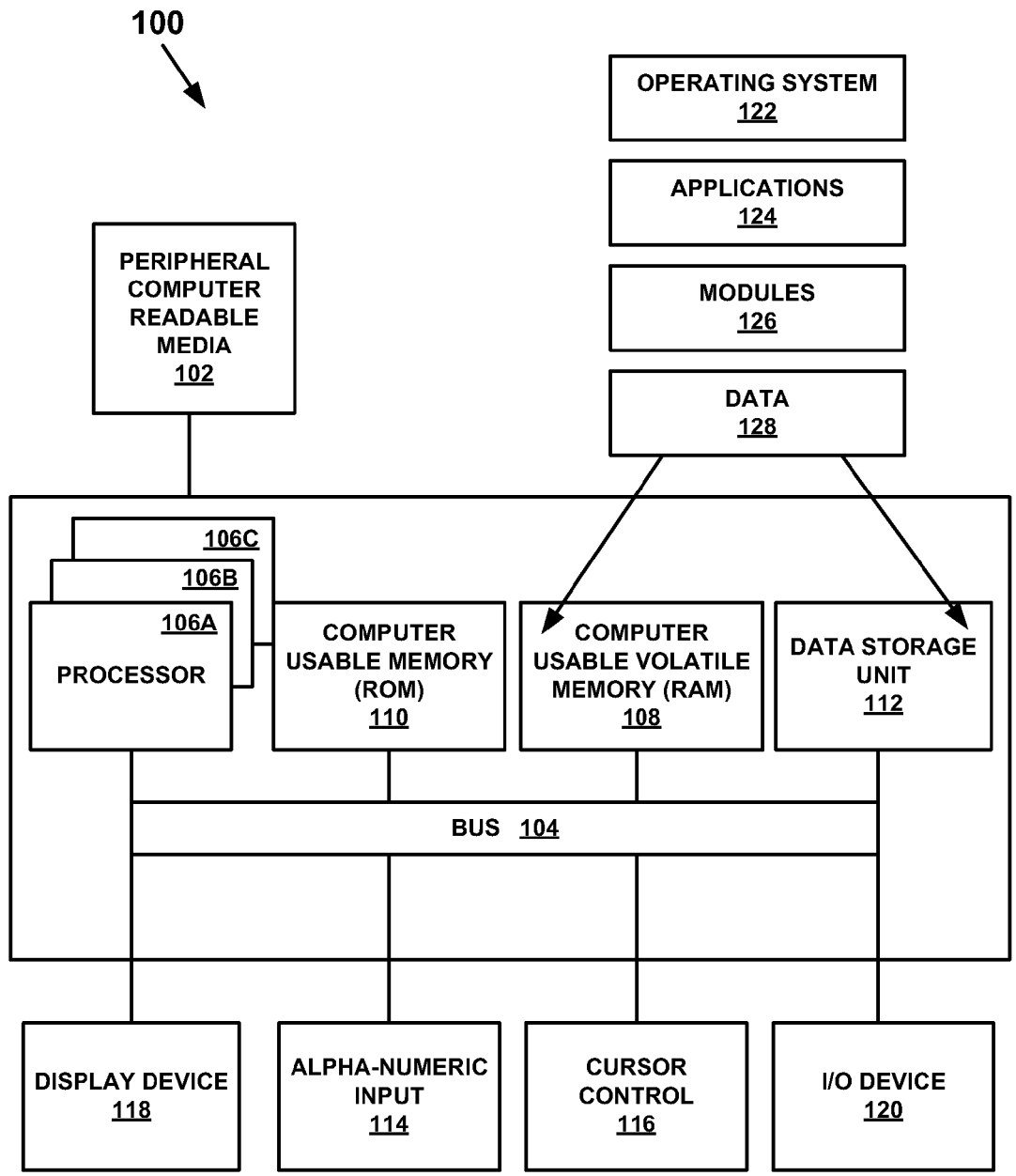
FIG. 1 is a diagram of an exemplary computer system used in accordance with embodiments of the present technology for a metadata search interface.

With reference now to FIG. 1, portions of the technology for a metadata search interface are composed of computer-readable and computer-executable instructions that reside, for example, in computer-usable media of a computer system. That is, FIG. 1 illustrates one example of a type of computer that can be used in at least one embodiment, which is discussed below, of the present technology for a metadata search interface.

FIG. 1 illustrates an exemplary computer system 100 used in accordance with embodiments of the present technology for a metadata search interface. It is appreciated that system 100 of FIG. 1 is exemplary only and that the present technology for a metadata search interface can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, such as random access memory (RAM), coupled to bus 104 for storing information and instructions for processors 106A, 106B, and 106C.

System 100 also includes computer usable non-volatile memory 110, such as read only memory (ROM), coupled to bus 104 for storing static information and instructions for processors 106A, 106B, and 106C. Also present in system 100 is a data storage unit 112 (for example, a magnetic or optical disk and disk drive) coupled to bus 104 for storing information and instructions. System 100 also includes an optional alphanumeric input device 114 coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, or keys on alpha-numeric input device 114 capable of signaling movement of a given direction or manner of displacement.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for a metadata search interface is found below.

Referring still to FIG. 1, various other components are depicted for system 100. Specifically, when present, an operating system 122, applications 124, modules 126, and data 128 are shown as typically residing in one or some combination of computer usable volatile memory 108, and data storage unit 112. In one embodiment, the present technology for a metadata search interface, for example, is stored as an application 124 or module 126 in RAM memory locations within computer usable volatile memory 108 and memory areas within data storage unit 112.

The computing system 100 is only one example of a suitable computing environment and is not intended to suggest any limitation as to the scope of use or functionality of the present technology. However the above description is not meant to limit implementation of the present technology to a particular combination of components illustrated in the exemplary computing system 100.

The present technology is operational with numerous other general-purpose or other computer environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, resident on a computer-usable medium which are executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

One embodiment of the present technology creates a configuration file for a metadata search interface. The configuration file uses Extensible Markup Language (XML) schema to describe the content and structure of a parametric search solution which also leverages full text indexes as well. More specifically, each search parameter element for the metadata search interface is separately described in the configuration file using XML schema. Additionally, the configuration file also comprises an attribute of a search predicate which correlates the predicate with a control. The control comprises a definition describing how to display a display element in the metadata search interface and a correlation between the display element and the predicate. For the purposes of the present invention, the term "predicate" corresponds to a "where clause" of a query.

In operation, the configuration file is accessed by an interface generator to determine the predicate(s) comprising the metadata search interface. Using the attributes associated with the predicates in the configuration file, an interface generator dynamically renders the metadata search interface based upon the descriptions in the controls. The metadata search interface can be dynamically created in runtime by using these definitions to describe the display elements comprising the metadata search interface.

The present technology further comprises a query builder component for retrieving values a user has entered into the display elements which define parameters of a search. The query builder component can access the configuration file to determine the controls associated with a search. The query builder component then accesses the controls and generates a query based upon the retrieved values from the metadata search interface and the controls associated with each display element.

The present technology is advantageous because the configuration file can be used to define the metadata query and the metadata search interface displayed on the UI. Additionally, the building of the metadata search interface is, as well as its rendering, is performed at runtime when the configuration file is executed Thus, the creation of new metadata search interfaces, as well as the modification of existing ones, can be performed quickly using the present technology.

Figure 2:
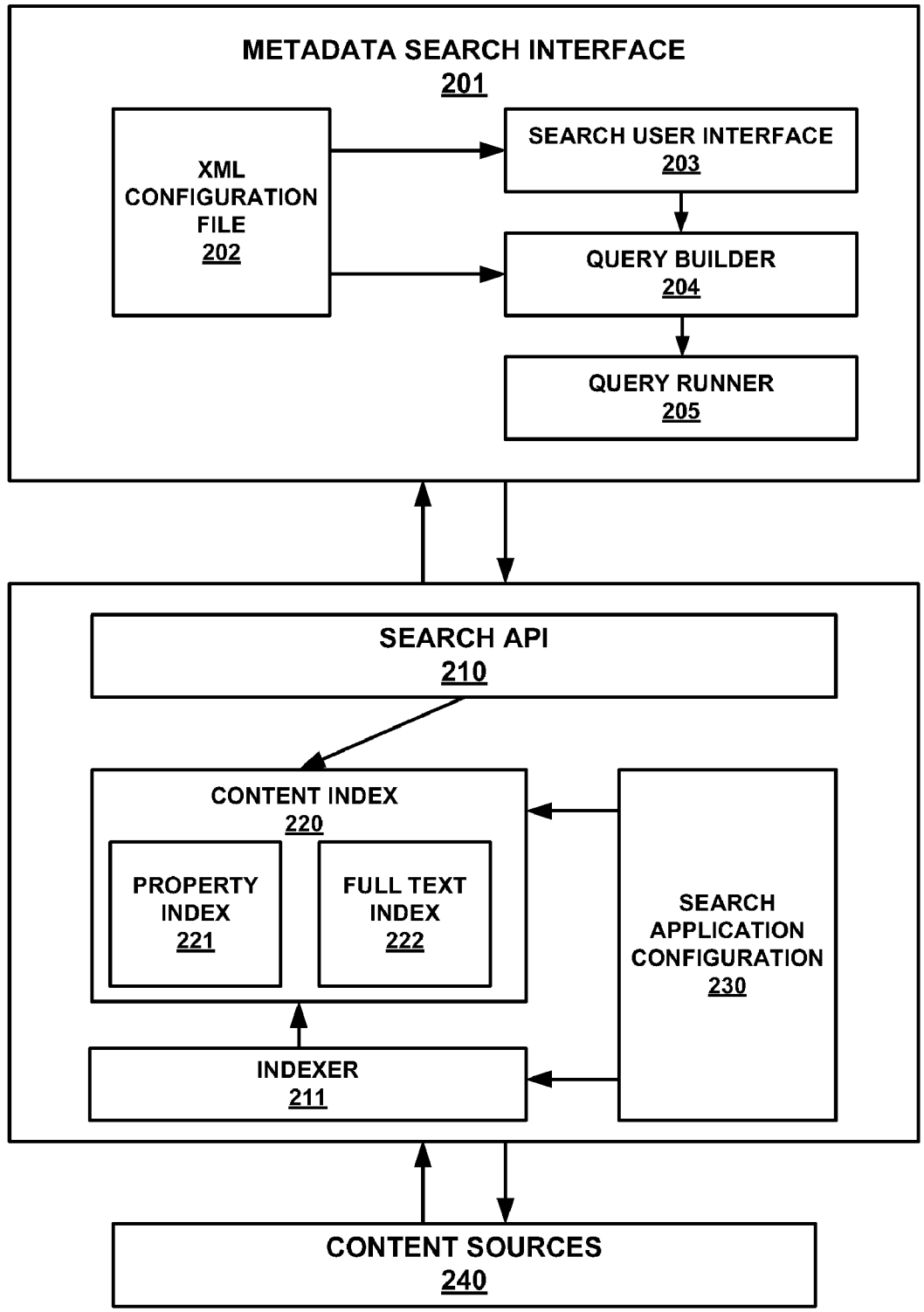
FIG. 2 is a block diagram of a search engine architecture in accordance with one embodiment of the present technology.

FIG. 2 is a block diagram of a search engine architecture 200 in accordance with one embodiment of the present technology. In FIG. 2, a metadata search engine interface 201 is communicatively coupled with a query engine 210. Metadata is generally defined as data about data. For example, while the text of a book may be considered data, metadata about the book may comprise the author, title, publication data, subject matter, or other defined parameters. Metadata search interface 201 is for displaying search parameters via a user interface 203 which is used to receive values from a user which are used as search parameters. In one embodiment of the present invention, an XML configuration file 202 is accessed to define user interface 203 and to construct a query based upon values stored in XML configuration file 202. The query constructed by query builder 204 is then passed to query runner 205 which then runs the query against search API 210. Search API 210 is used for executing keyword and parametric queries against content stored in search engine architecture 200.

Indexer 211 is an executed program or script which searches content sources 240 based upon configuration data stored in search application configuration 230. Indexer 211 is further for processing text and properties of structured and unstructured content received from content sources 240 such as Web content, files, business data, personal portal pages, etc. In one embodiment, indexer 211 may comprise a protocol handler (not shown) for opening content is its existing protocol to expose documents and data which is to be filtered. Indexer 211 may also comprise a filter (not shown) which then filters individual items from the content sources 240. In one embodiment, document properties are saved in a property index 220 comprising a table of properties and their values. Using the property index 220, values can be retrieved and sorted. In addition, queries against the full text index 221 are supported which facilitates keyword based search of content. It is noted that search engine architecture 200 may be implemented upon computer system 100, or in a distributed computing environment in embodiments of the present technology.

Figure 3:
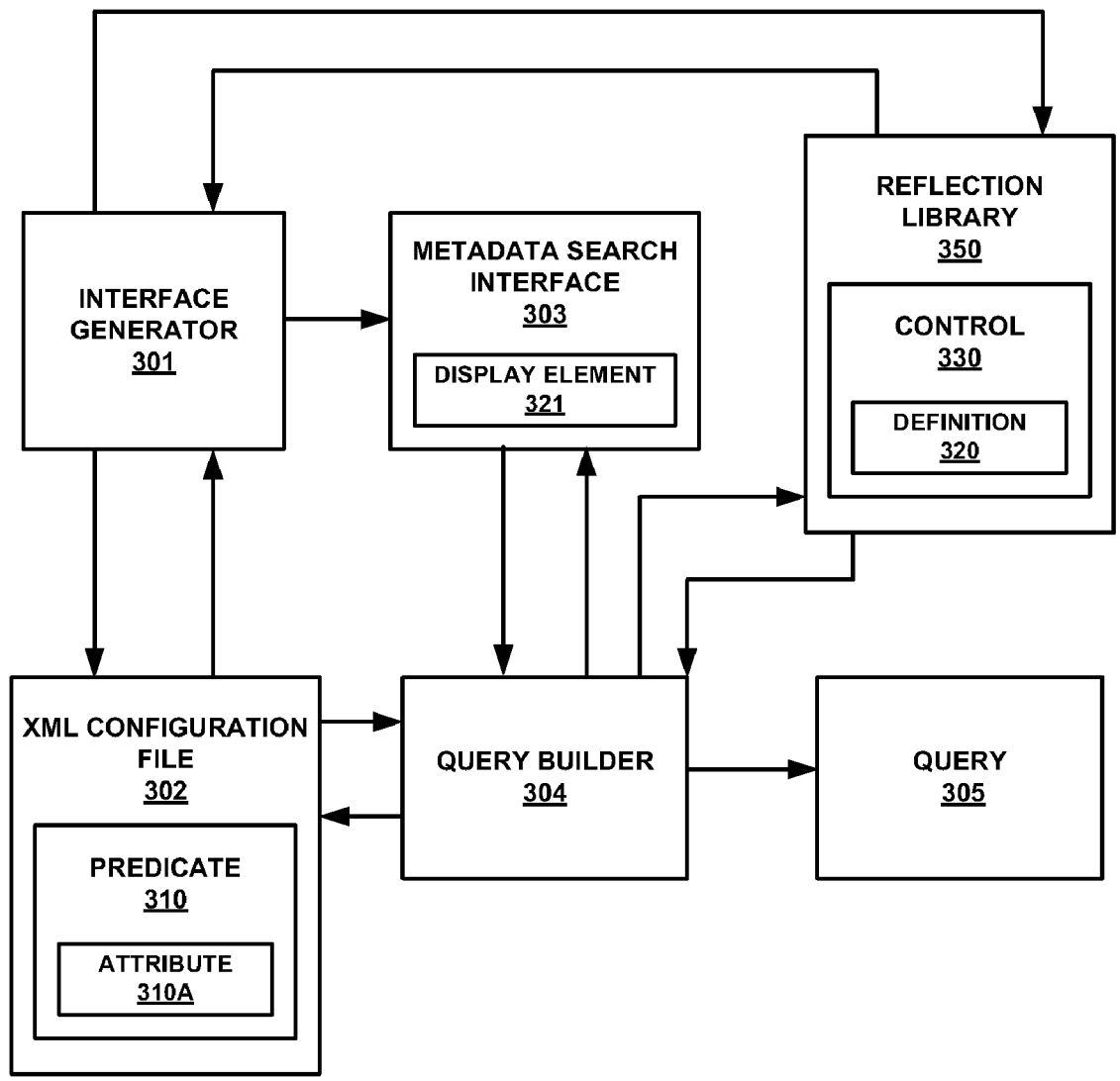
FIG. 3 is a block diagram of a metadata search interface system in accordance with one embodiment of the present technology.

FIG. 3 is a block diagram of a metadata search interface system 300 in accordance with one embodiment of the present technology. In FIG. 3, an interface generator 301 accesses an XML configuration file 302. In one embodiment, XML configuration file 302 comprises an XML compatible data file which is used to simultaneously define a user interface (e.g., metadata search interface 303) and a search query (performed by search engine architecture 200. In one embodiment, interface generator 301 is a software implemented component for accessing the XML schema in XML configuration file 302 and generating metadata search interface 303 at runtime.

XML is a programming language operating as an extension to HTML and providing enhanced control of content. It may be use to define the content of a document rather than the presentation of it. XML is text-based and formats data by using schema to define elements and attributes that can appear in a document. Thus, XML can be used to share structured data across different types of information systems.

With reference again to FIG. 3, XML configuration file 302 further comprises a predicate 310. In the present technology, the XML schema describing XML configuration file 302 includes a type to describe a where clause. A where clause is used in a metadata search to specify the conditions that determine whether a document or data is included in the results returned by the query. The where clause specifies criteria for data matching the search. Furthermore, a where clause supports multiple nested predicate types in embodiments of the present technology. Search predicates are expressions that assert some fact about a value. Typically, the predicates are combined using logical operators to form a query. As an example, a where clause may comprise a predicate for the title of an instance of content, a predicate for the author's name, a predicate for the publisher, a predicate for the data published, etc. Examples of predicates used in the present technology as shown below:

```
PropertyA = "<value>'
contains(PropertyA, '"<value>'")
freetext(PropertyA,'"<value>'")
LastUpdated >="<date>" and LastUpdated <= "<second date>"
```

Predicates may support full text searches wherein the meaning of the content, title, and other columns and support linguistic matching (e.g., to search against alternative word forms, phrases, proximity searching, etc.) are matched. Predicates may also support non-full text searches in which the values of specified columns are matched. A query is constructed based upon the predicates used to define parameters for the search, and the manner in which the predicates are related to each other. Thus, documents and data are returned in the query if they meet the specified comparisons and combinations of the query as expressed by the predicates of the query.

In the present technology, each predicate in the where element has an attribute 310a which associates a control (e.g., 330) that metadata search interface 303 uses to collect the information used to build the query. In general, a control is a software component which can be used for exposing an action to a user. In the present technology, metadata search interface 303 is a web page comprising one or more controls for collecting search parameter data from a user. For example, one control may comprise a drop-down box for presenting a list of search parameters to a user when constructing a query. Another control may utilize radio buttons, or a text field in which the user manually enters a search parameter for the query. In one embodiment of the present technology, definition 320 which defines how to display a display element (e.g., 321) may be contained within control 330.

In the present technology, interface generator 301 accesses predicate 310 and determines, using the schema describing predicate 301, an attribute 310A describing which control element to use in creating a display element (e.g., 321) on metadata search interface 303. Display element 321 is the portion of metadata search interface 303 with which the user interacts to define the parameters of the search. In one embodiment, interface generator 301 accesses control 330 which is stored in a reflection library 350.

Runtime reflection, which is also referred to as class description, is a metadata-based technique that allows a program to determine aspects of an object's type, properties, and property values at runtime. Using runtime reflection, a program can also find and dynamically alter the property values of objects such as predicate 310. For example, in embodiments of the present technology, a designer can create a where clause in XML configuration file 302 by selecting one or more predicates 310. In embodiments of the present technology, each predicate 310 is in turn bound to a control 330 by an attribute 310A in the XML schema used to describe predicate 310. Each control 330 describes how to collect information corresponding to the corresponding predicate 310. Additionally, each control 330 is bound to a definition 320 that describes how to render the corresponding predicate 310 on metadata search interface 303.

Using runtime reflection, a designer can identify and select search parameters (e.g., a predicate type) based upon known attributes of the content to create an XML configuration file 302 for a search interface webform (e.g., metadata search interface 303) which is used to initiate a query. In so doing, embodiments of the present technology also automatically define how the webform is rendered because each search parameter has an attribute which describes how it is rendered on the webform and how to collect that information from the web form in order to construct a query.

Runtime reflection facilitates creating dynamic assemblies of controls in runtime directly in memory (e.g., volatile memory 108 of FIG. 1). Additionally, a developer can easily add or remove predicates from metadata search interface 303 simply by reconfiguring XML configuration file 302. In other words, metadata search interface 303 is not a static file, but is instead dynamically created by assembling controls listed in XML configuration file 302 to create metadata search interface 303. Thus, a developer can simultaneously define a query and how the UI for that query is rendered by adding or removing predicates from XML configuration file 302.

In FIG. 3, query builder 304 accesses metadata search interface 303 to determine the user entered search parameters. Query builder 304 also accesses control 330 via reflection library 350 in order to correlate the user selected search parameters with the predicate 310. In one embodiment, query builder 304 accesses XML configuration file 302 to determine the control associated with each predicate 310 used to construct metadata search interface. Query builder 304 then constructs a where clause for a query in which predicate 310 is related with other predicates of metadata search interface 303 to properly convey the parameters of a user's query. Query builder 304 accesses the display element 321 of metadata search interface 303 in order to retrieve the actual value the user has entered in order to define the search parameters. Query builder 304 then joins this information to form query 305 which is passed to search engine architecture 200.

Figure 4:
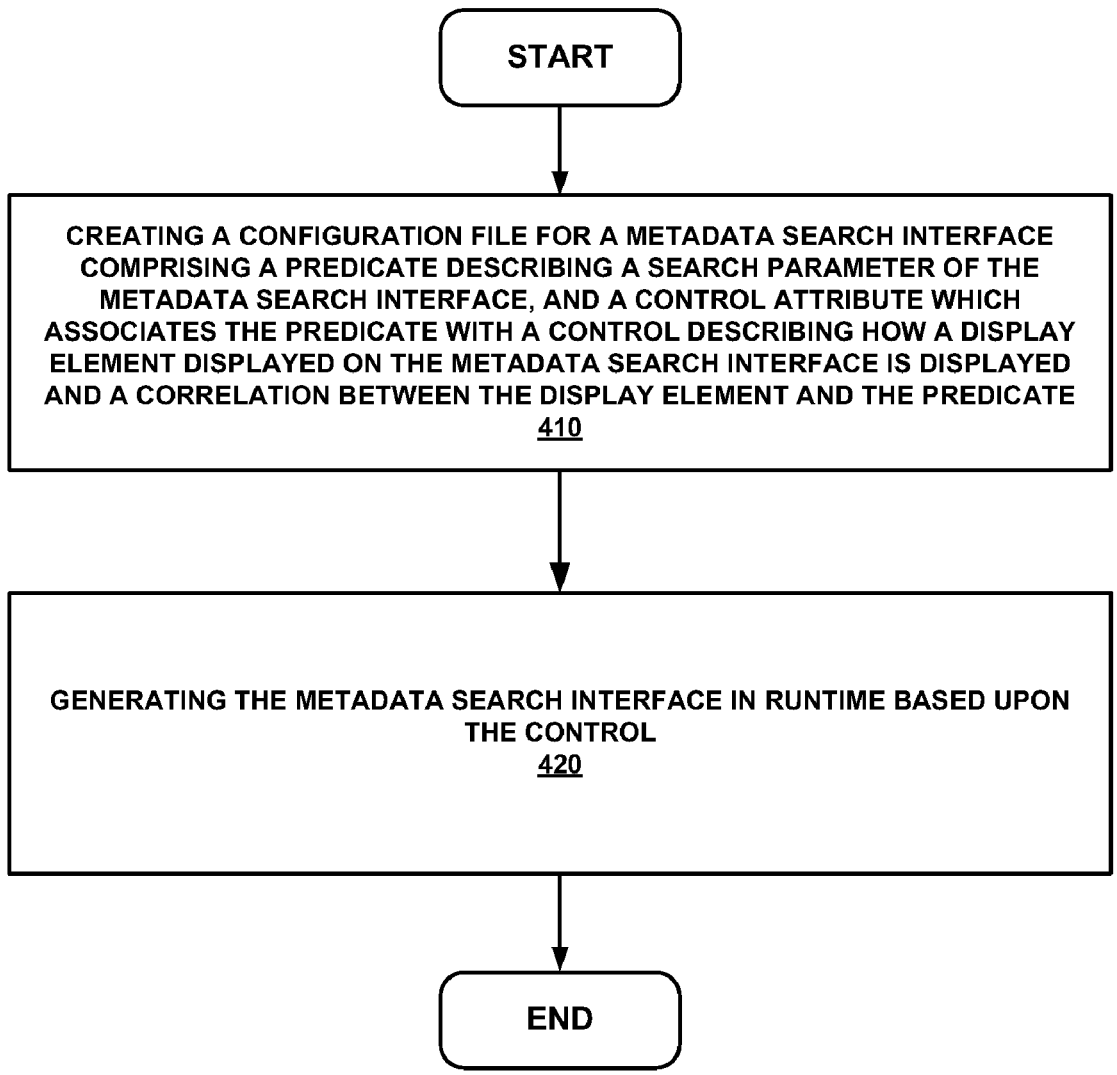
FIG. 4 is a flowchart of a method for implementing a metadata search interface in accordance with one embodiment of the present technology.

FIG. 4 is a flowchart of a method 400 for implementing a metadata search interface in accordance with one embodiment of the present technology. In operation 410 of FIG. 4, an XML configuration file (e.g., 302 of FIG. 3) is created for a metadata search interface. In embodiments of the present technology, XML configuration file 302 comprises a predicate 310 describing a search parameter of the metadata search interface (e.g., 303 of FIG. 30. XML configuration file 302 further comprises a control attribute (e.g., 310A) which associates predicate 310 with a control (e.g., 330 of FIG. 3) which describes how a display element (e.g., display element 321 of FIG. 3) is displayed on the metadata search interface and a correlation between display element 321 and predicate 310.

In operation 420 of FIG. 4, the metadata search interface is generated in runtime based upon the control. In embodiments of the present technology, interface generator 301 accesses XML configuration file 302 and determines controls (e.g., 330) used to created metadata search interface 303 by determining which attributes (e.g., 310A) are associated with the predicates (e.g., 310) comprising the search. Interface generator 301 then accesses the controls (e.g., 330) via reflection library 350 to get the definitions (e.g., 320) used in rendering the display elements (e.g., 321) comprising metadata search interface 303.

In embodiments of the present invention, this facilitates dynamically generating a metadata search interface 303 in runtime because the definitions for the display elements are assembled at runtime when XML configuration file 302 is executed. An additional advantage is that metadata search interface can easily be reconfigured to accommodate different search parameters simply by adding or removing predicates from XML configuration file 302. Because the metadata search interface is rendered in runtime based upon the control attributes corresponding to predicates of the search, the metadata search interface can be automatically reconfigured when the definition of the search is redefined. This is in contrast to static query interfaces which are typically manually reconfigured when the search is redefined.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for implementing a metadata search interface, said computer-implemented method comprising:
  accessing a configuration file for said metadata search interface, said configuration file comprising:
    a predicate describing a search parameter of said metadata search interface, said predicate supporting full text searches and corresponding to a where clause that supports multiple nested predicate types, and
    a control attribute which associates said predicate with a control that includes a definition describing how a display element displayed on said metadata search interface is displayed and a correlation between said display element and said predicate;
  generating said metadata search interface in runtime based upon said control;
  accessing the display element to determine a value selected for the predicate;
  determining the search parameter defined by the predicate based upon the control; and
  constructing a query to a search engine architecture based upon the search parameter and the value.

2. The computer-implemented method as recited in claim 1 further comprising:
  utilizing an Extensible Markup Language (XML) schema type to describe said predicate and said control attribute.

3. The computer-implemented method as recited in claim 1 further comprising:
  accessing said definition associated with said control;
  automatically creating said metadata search interface wherein said display element is rendered in runtime when said configuration file is executed.

4. The computer-implemented method as recited in claim 3 further comprising:
  accessing a reflection library to access said control.

5. The computer-implemented method as recited in claim 3 further comprising:
  re-configuring said configuration file wherein a second predicate for said metadata search interface is included in said configuration file; and
  automatically creating said metadata search interface wherein said second display element is rendered in runtime when said configuration file is executed based upon a second control associated with said second predicate.

6. A computer-usable storage medium storing instructions wherein the instructions when executed cause a computer system to perform a method for implementing a metadata search interface, said method comprising:

accessing a configuration file for said metadata search interface, said configuration file comprising:
- a predicate describing a search parameter of said metadata search interface, said predicate supporting full text searches and corresponding to a where clause that supports multiple nested predicate types, and
- a control attribute which associates said predicate with a control that includes a definition describing how a display element displayed on said metadata search interface is displayed and a correlation between said display element and said predicate; and generating said metadata search interface in runtime based upon said control;

accessing the display element to determine a value selected for the predicate;

determining the search parameter defined by the predicate based upon the control; and constructing a query to a search engine architecture based upon the search parameter and the value.

7. The computer-usable storage medium as recited in claim 6 wherein said method further comprises:
utilizing an Extensible Markup Language (XML) schema type to describe said predicate and said control attribute.

8. The computer-usable storage medium as recited in claim 6 wherein said method further comprises:
accessing said definition associated with said control;
automatically creating said metadata search interface wherein said display element is rendered in runtime when said configuration file is executed.

9. The computer-usable storage medium as recited in claim 8 wherein said method further comprises:
accessing a reflection library to access said control.

10. The computer-usable storage medium as recited in claim 8 wherein said method further comprises:
re-configuring said configuration file wherein a second predicate for said metadata search interface is selected; and
automatically creating said metadata search interface wherein said second display element is rendered in runtime when said configuration file is executed based upon a second control associated with said second predicate.

11. A metadata search interface system comprising:
a first component for accessing a configuration file for said metadata search interface and determining a display element corresponding to a predicate of a query, said first component further for displaying said display element in said metadata search interface, said predicate supporting full text searches and corresponding to a where clause that supports multiple nested predicate types; and
a second component at least partially executed by a processor for accessing a value describing a search parameter and for accessing a control associated with said predicate which describes a correlation between said value and said predicate of said metadata search interface, said second component further for automatically generating a metadata query based upon said predicate and said value.

12. The metadata search interface system of claim 11 wherein said first component is further for automatically displaying said metadata search interface in runtime based upon at least one of said predicates within said configuration file.

13. The metadata search interface system of claim 11 wherein said first component accesses an Extensible Markup Language (XML) schema type which correlates said control with said predicate.

14. The metadata search interface system of claim 13 wherein said second component accesses said XML schema type to determine said control element and to determine said predicate.

15. The metadata search interface system of claim 11 wherein said first component dynamically creates said metadata search interface in runtime by accessing at least one of said control via a reflection library.

* * * * *

UNITED STATES PATENT AND TRADEMARK OFFICE
CERTIFICATE OF CORRECTION

| | | |
|---|---|---|
| PATENT NO. | : 8,156,144 B2 | Page 1 of 1 |
| APPLICATION NO. | : 12/018197 | |
| DATED | : April 10, 2012 | |
| INVENTOR(S) | : Begley et al. | |

It is certified that error appears in the above-identified patent and that said Letters Patent is hereby corrected as shown below:

In The Specification

In column 5, line 57, delete "use" and insert -- used --, therefor.

Signed and Sealed this
Third Day of February, 2015

Michelle K. Lee
*Deputy Director of the United States Patent and Trademark Office*